(12) United States Patent
Nose

(10) Patent No.: US 10,733,927 B2
(45) Date of Patent: Aug. 4, 2020

(54) PROJECTION APPARATUS, PROJECTION SYSTEM, AND NON-TRANSITORY COMPUTER-READABLE RECORDING MEDIUM

(71) Applicant: Masaki Nose, Kanagawa (JP)

(72) Inventor: Masaki Nose, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/760,386

(22) PCT Filed: Sep. 28, 2016

(86) PCT No.: PCT/JP2016/004386
§ 371 (c)(1),
(2) Date: Mar. 15, 2018

(87) PCT Pub. No.: WO2017/061086
PCT Pub. Date: Apr. 13, 2017

(65) Prior Publication Data
US 2018/0261141 A1    Sep. 13, 2018

(30) Foreign Application Priority Data
Oct. 8, 2015   (JP) .................................. 2015-200383

(51) Int. Cl.
*G09G 3/20* (2006.01)
*G09G 5/10* (2006.01)
(Continued)

(52) U.S. Cl.
CPC ........... *G09G 3/2003* (2013.01); *G09G 3/001* (2013.01); *G09G 3/002* (2013.01); *G09G 5/02* (2013.01);
(Continued)

(58) Field of Classification Search
CPC .................. G09G 3/2003; G09G 5/10; G09G 2320/0626; H04N 9/31; H04N 5/74
See application file for complete search history.

(56) References Cited

U.S. PATENT DOCUMENTS

| 8,867,817 B1 | 10/2014 | Cooper et al. |
| 2005/0185285 A1 | 8/2005 | Miyasaka |

(Continued)

FOREIGN PATENT DOCUMENTS

| EP | 2573670 | 3/2013 |
| EP | 2999219 | 3/2016 |

(Continued)

OTHER PUBLICATIONS

International Search Report dated Dec. 20, 2016 in PCT/JP2016/004386 filed on Sep. 28, 2016.

(Continued)

*Primary Examiner* — Matthew Salvucci
(74) *Attorney, Agent, or Firm* — IPUSA, PLLC

(57) ABSTRACT

A projection apparatus includes an inputting unit configured to input image data that expresses an image to be projected; a converting unit configured to convert pixel values of the image data into first parameters that indicate lightness and second parameters that indicate information concerning color; a determining unit configured to determine whether to invert the first parameters; an inverting unit configured to invert the first parameters to calculate third parameters if the determining unit has determined to invert the first parameters; a generating unit configured to generate inverted data based on the second parameters and the third parameters; and a projecting unit configured to project the image based on the inverted data.

12 Claims, 15 Drawing Sheets

(51) Int. Cl.
*H04N 9/31* (2006.01)
*G09G 5/06* (2006.01)
*G09G 3/00* (2006.01)
*G09G 5/02* (2006.01)
*H04N 5/74* (2006.01)

(52) U.S. Cl.
CPC ............... *G09G 5/06* (2013.01); *G09G 5/10* (2013.01); *H04N 5/74* (2013.01); *H04N 9/31* (2013.01); *H04N 9/3182* (2013.01); *G09G 2320/0233* (2013.01); *G09G 2320/0238* (2013.01); *G09G 2320/0242* (2013.01); *G09G 2320/0271* (2013.01); *G09G 2320/0276* (2013.01); *G09G 2320/066* (2013.01); *G09G 2320/0626* (2013.01); *G09G 2340/06* (2013.01); *G09G 2340/14* (2013.01); *G09G 2360/16* (2013.01)

(56) References Cited

U.S. PATENT DOCUMENTS

| | | |
|---|---|---|
| 2005/0231445 A1 | 10/2005 | Naganuma et al. |
| 2009/0091718 A1 | 4/2009 | Obi et al. |
| 2011/0211732 A1 | 9/2011 | Rapaport |
| 2012/0328205 A1 | 12/2012 | Wen et al. |
| 2013/0002729 A1* | 1/2013 | Lee .................. G09G 3/20 345/690 |
| 2013/0239057 A1* | 9/2013 | Ubillos ............... G06F 3/04855 715/833 |
| 2014/0160014 A1 | 6/2014 | Dominici et al. |
| 2014/0365965 A1* | 12/2014 | Bray ..................... G06T 11/001 715/810 |
| 2015/0109533 A1 | 4/2015 | Ikeda |
| 2015/0242704 A1 | 8/2015 | Nobori |

FOREIGN PATENT DOCUMENTS

| | | |
|---|---|---|
| JP | 2005-208092 | 8/2005 |
| JP | 2006-162356 | 6/2006 |
| JP | 2006-322961 | 11/2006 |
| JP | 2016-052073 | 4/2016 |
| JP | 2016-063342 | 4/2016 |
| WO | 97/008889 | 3/1997 |

OTHER PUBLICATIONS

Extended European Search Report for 16853243.0 dated Jul. 4, 2018.
Office Action dated Jul. 30, 2019 issued with respect to the corresponding European Patent Application No. 16853243.0.

* cited by examiner

[Fig. 1]
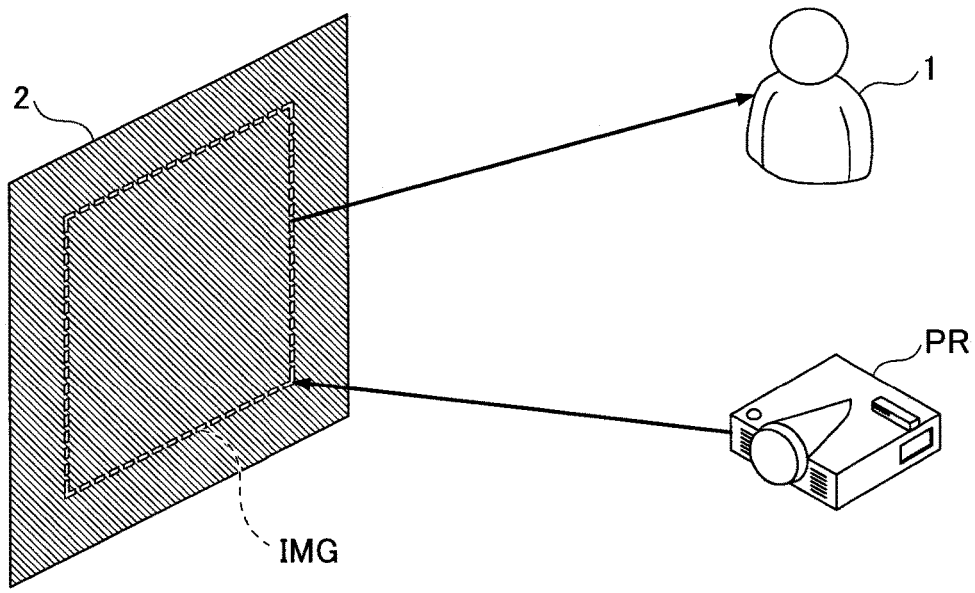
[Fig. 2]
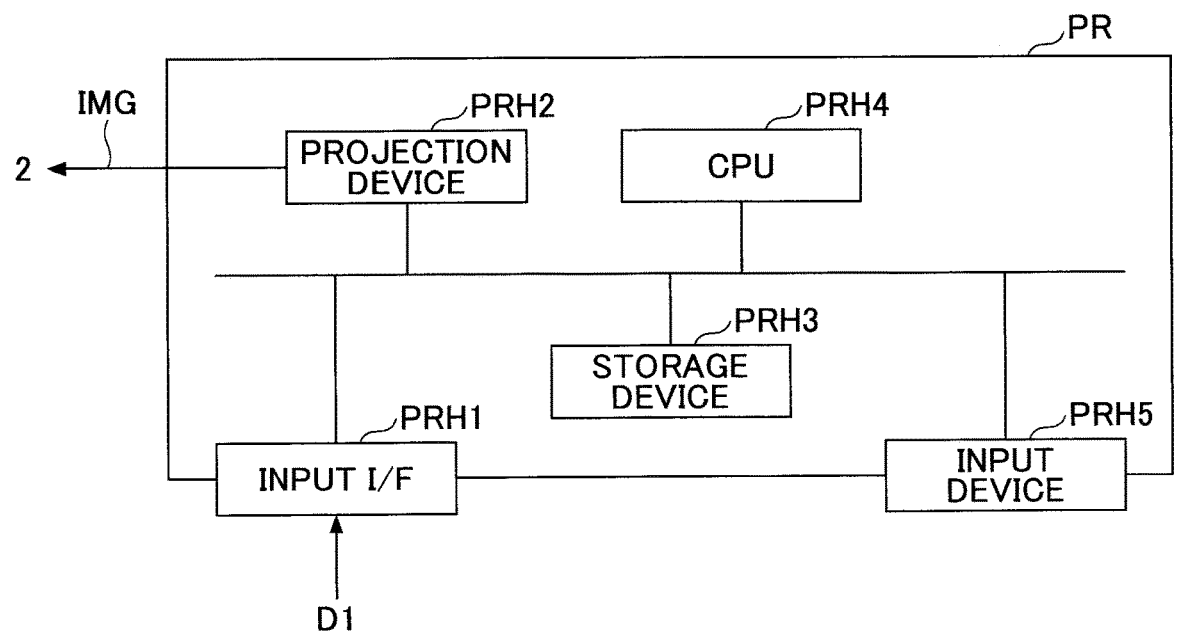

[Fig. 3]
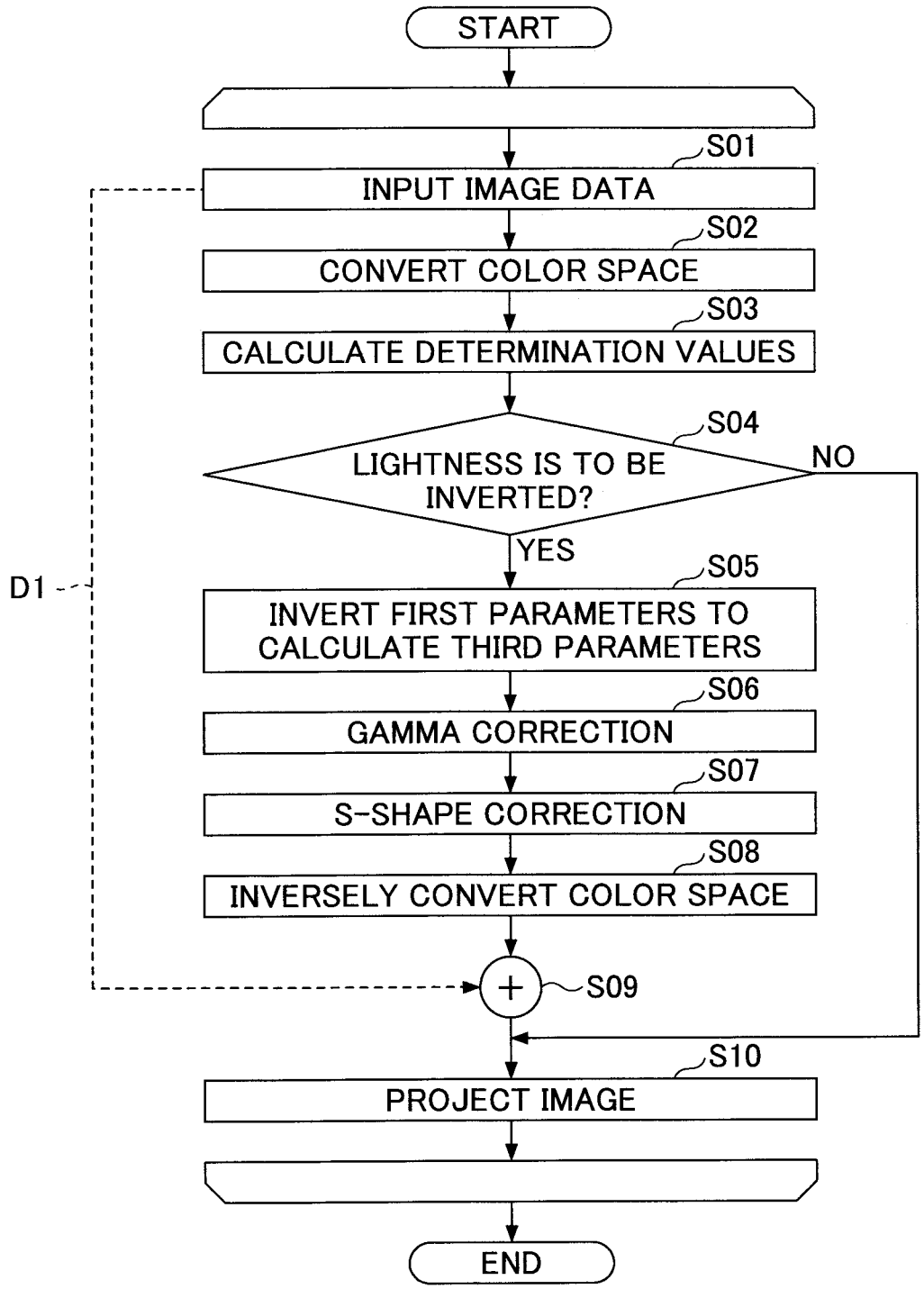

[Fig. 4]
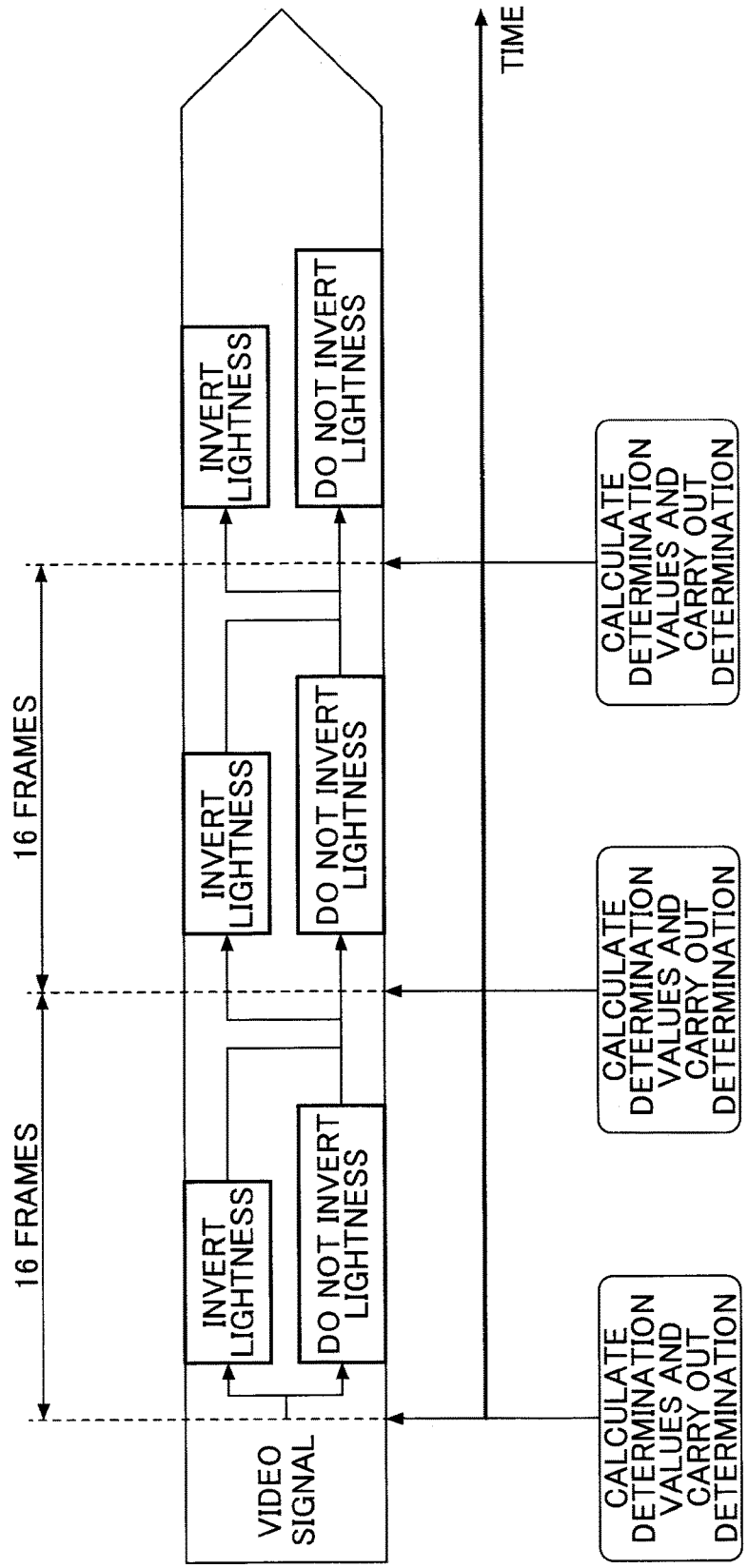

[Fig. 5]
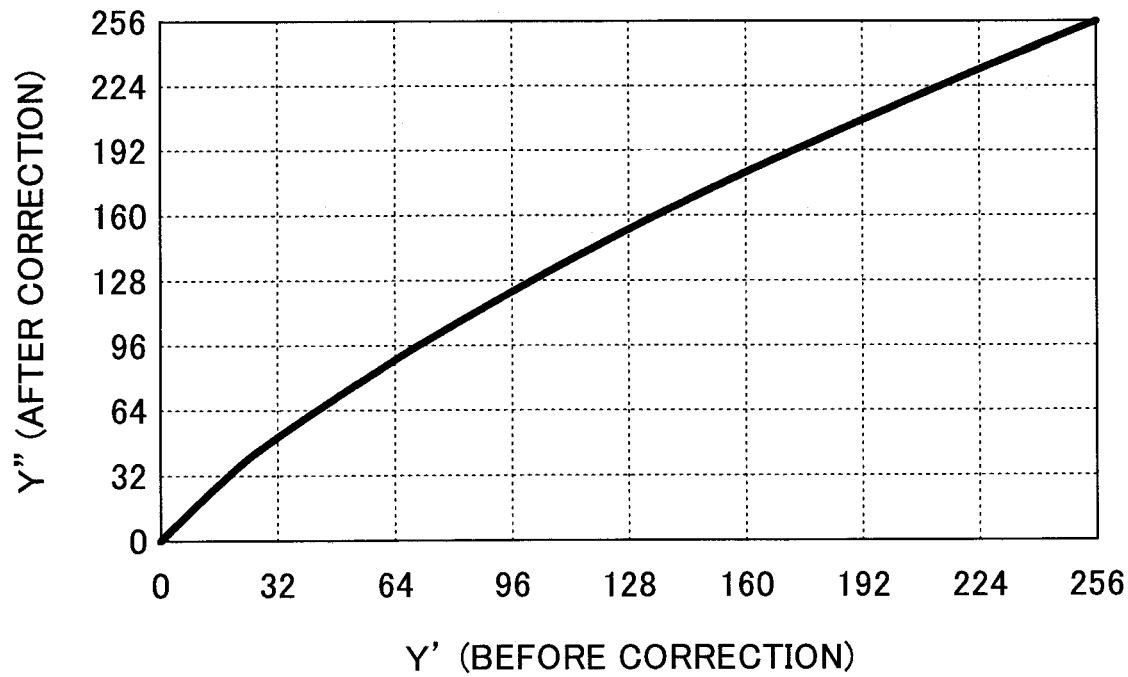
[Fig. 6]
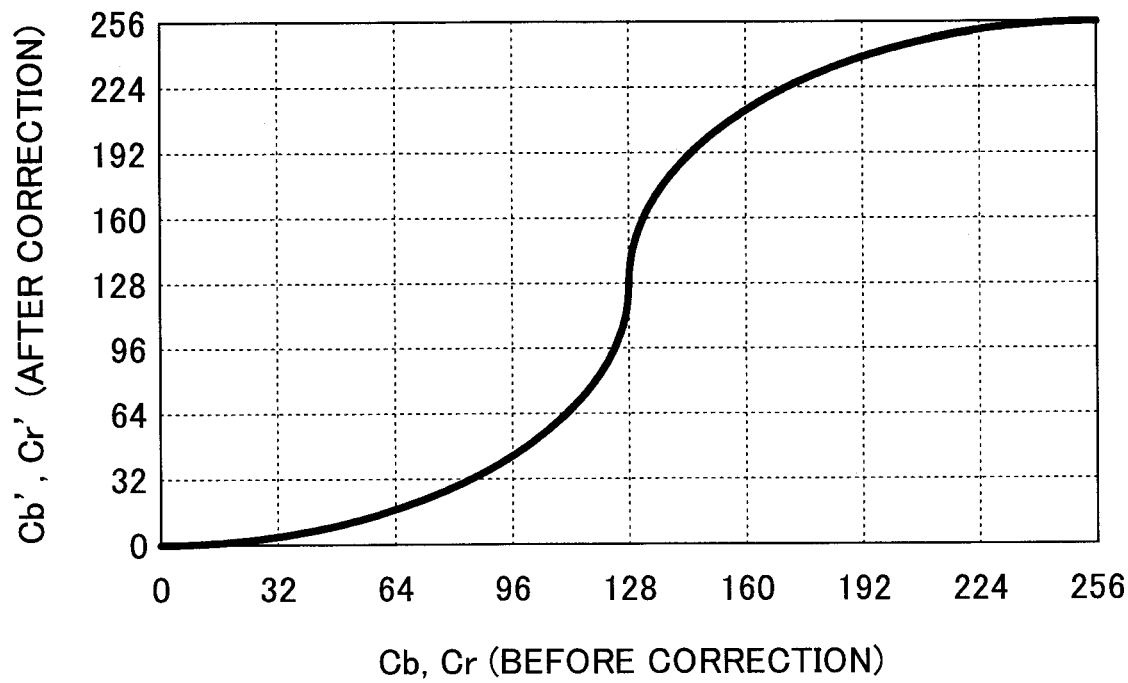

[Fig. 7]
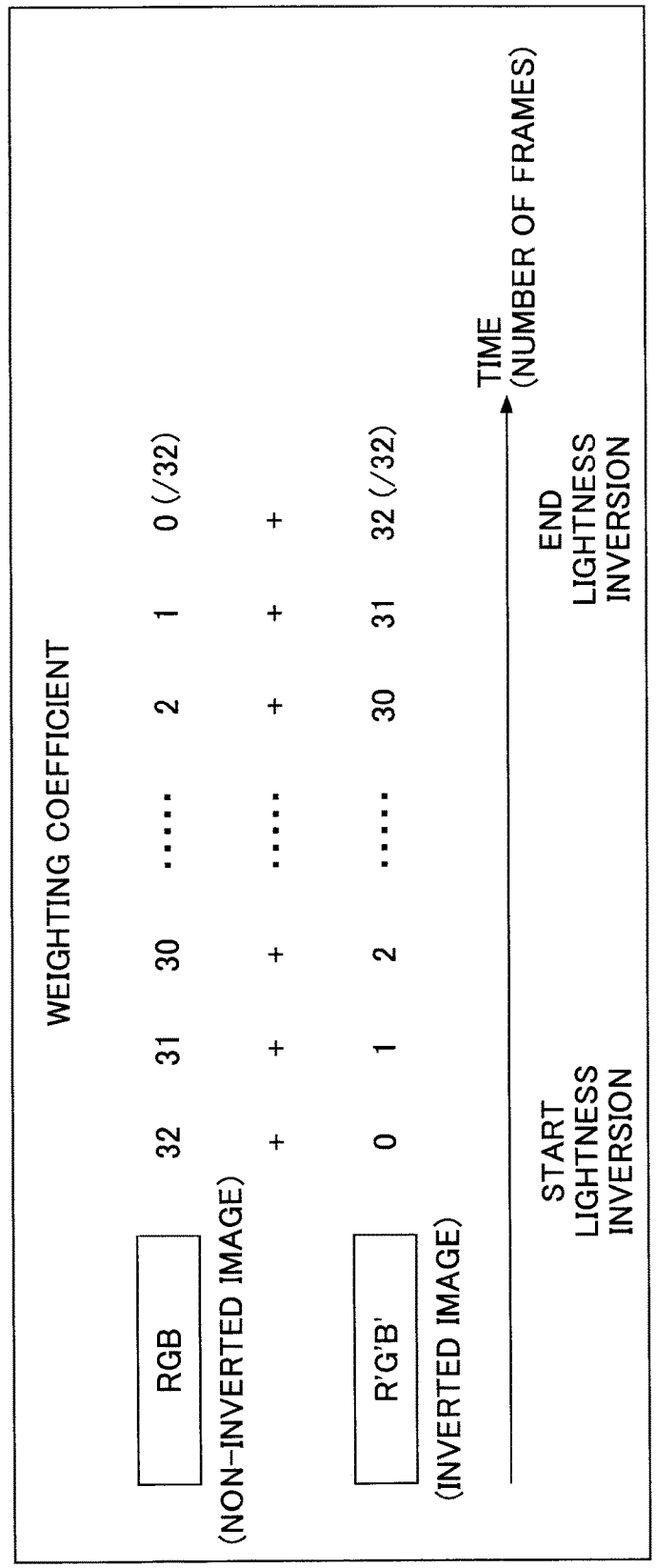

[Fig. 8]
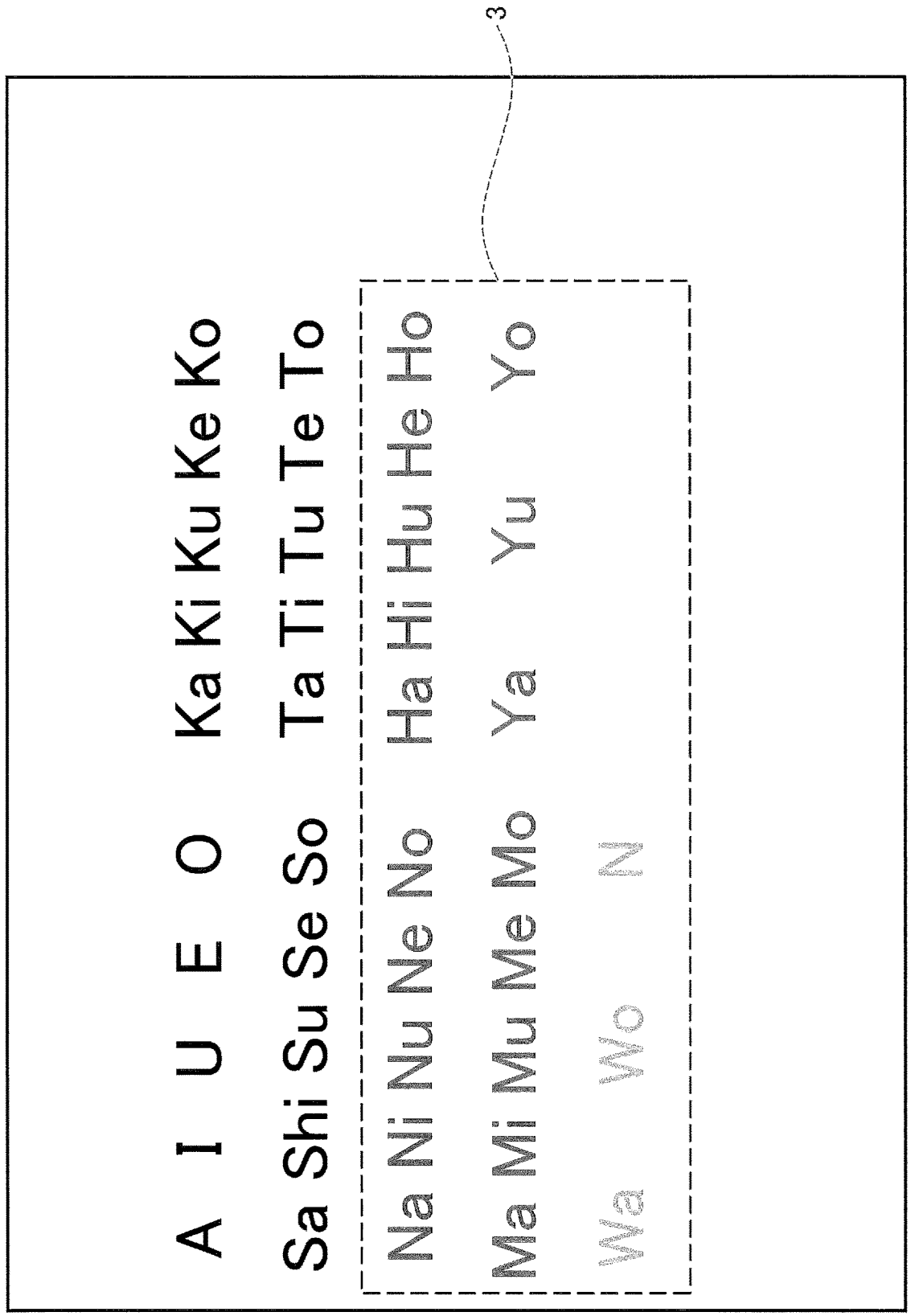

[Fig. 9]
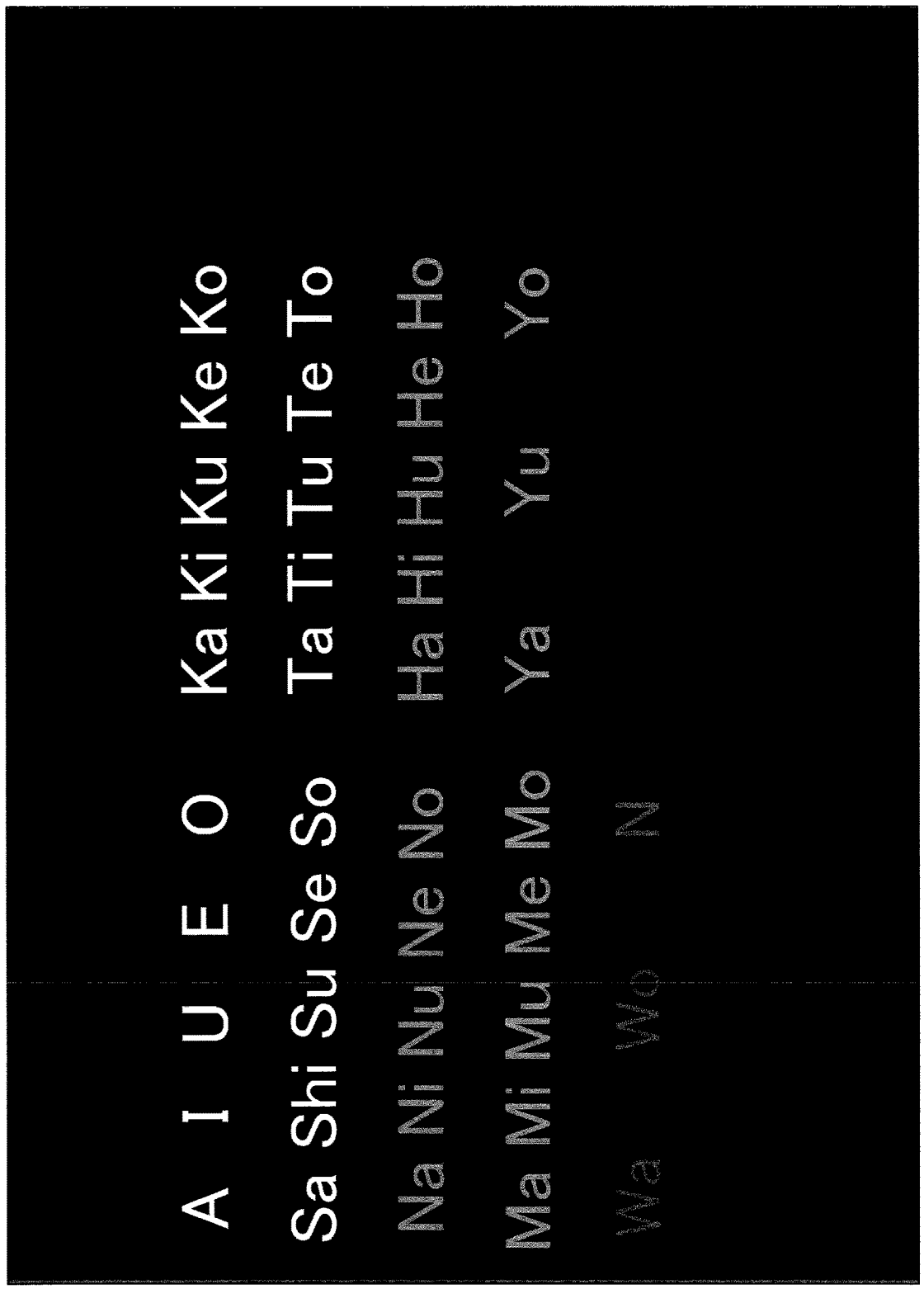

[Fig. 10]
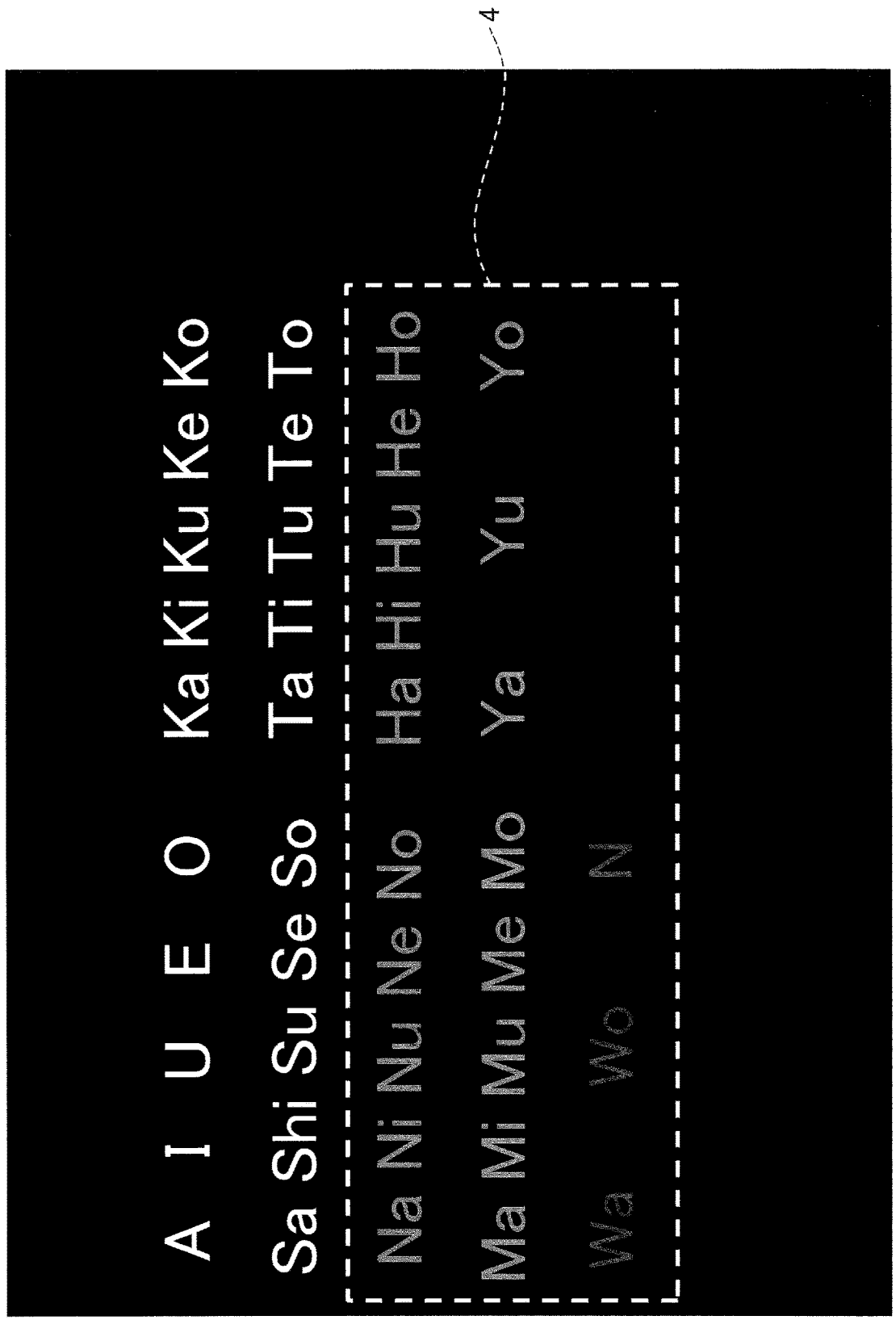

【Fig. 11A】
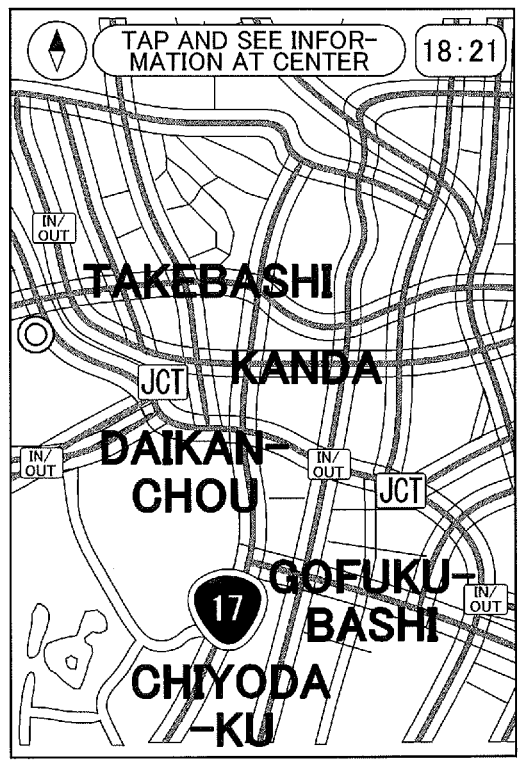
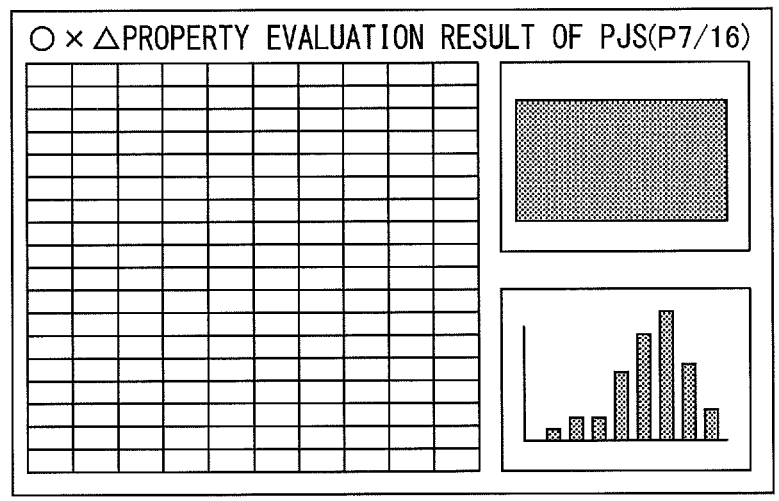

[Fig. 11B]
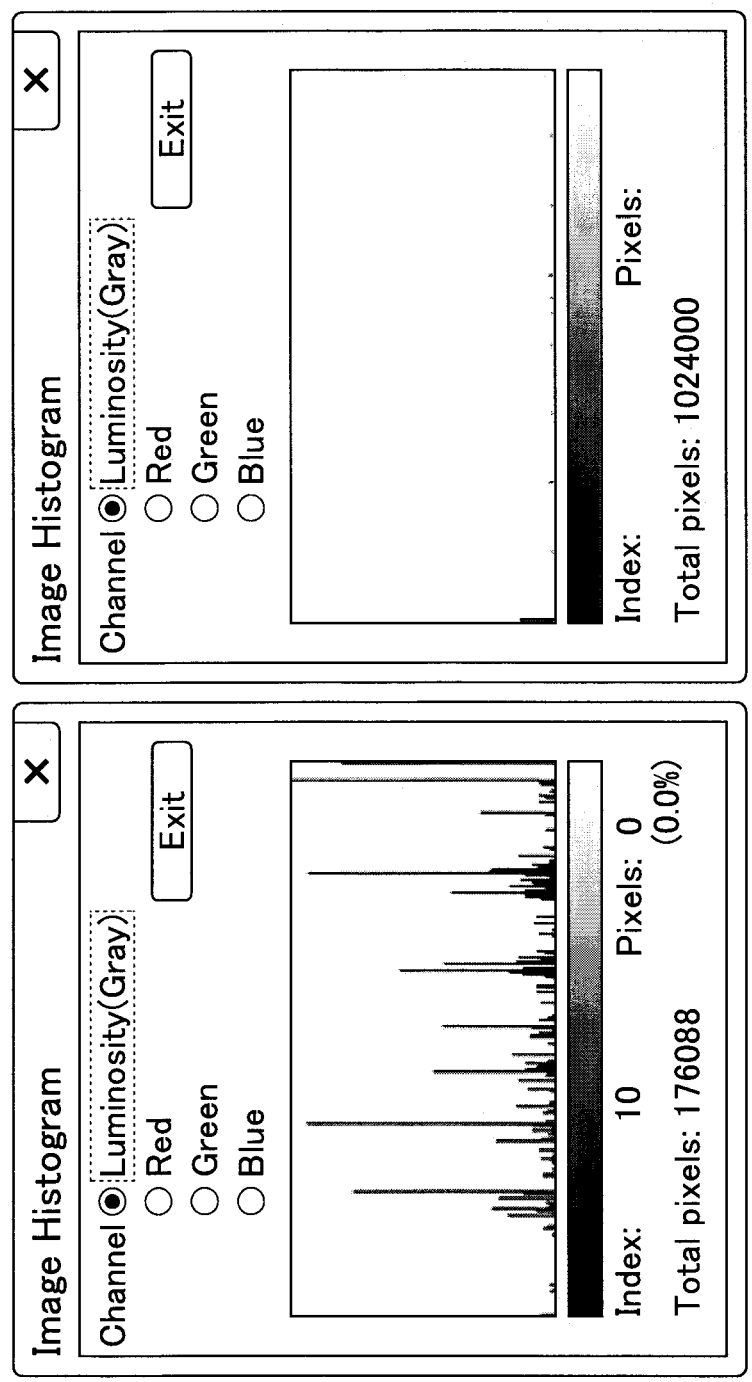

[Fig. 11C]
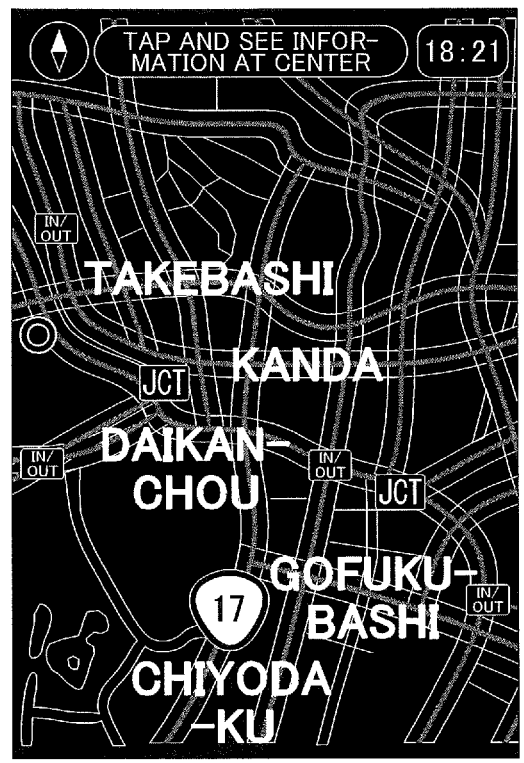
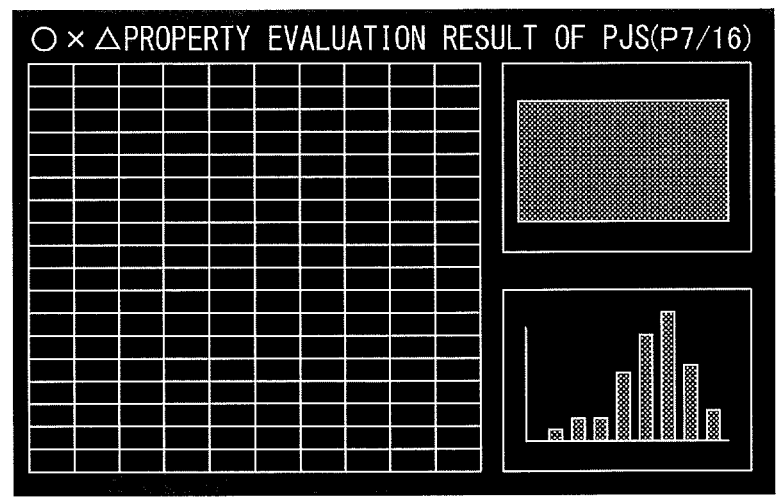

[Fig. 11D]
[Fig. 11E]
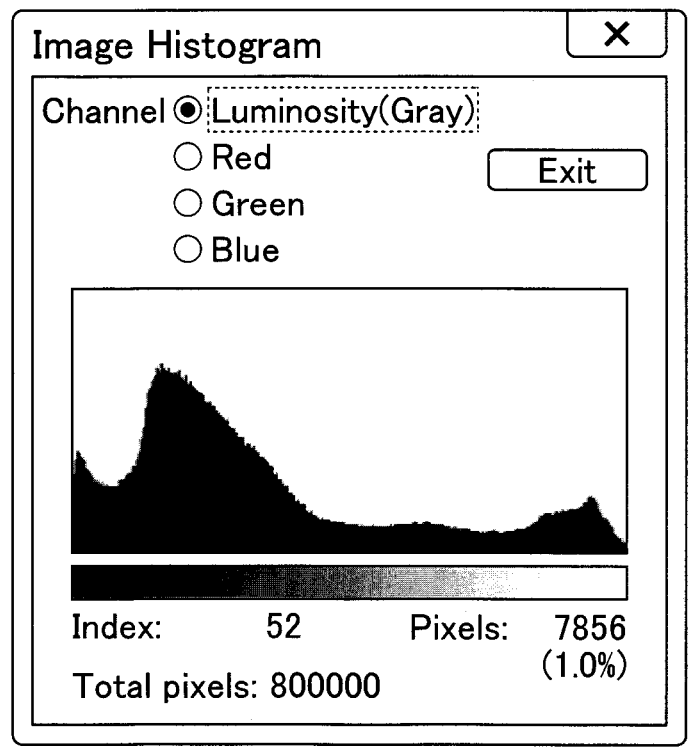

[Fig. 11F]
[Fig. 12]
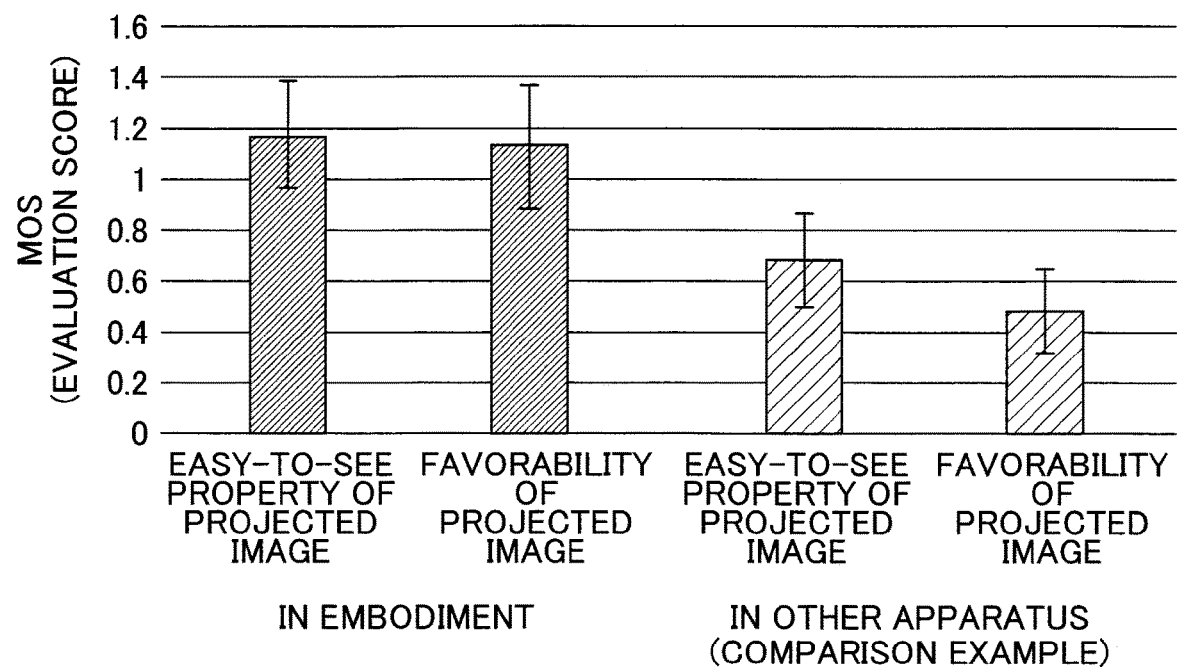

[Fig. 13]
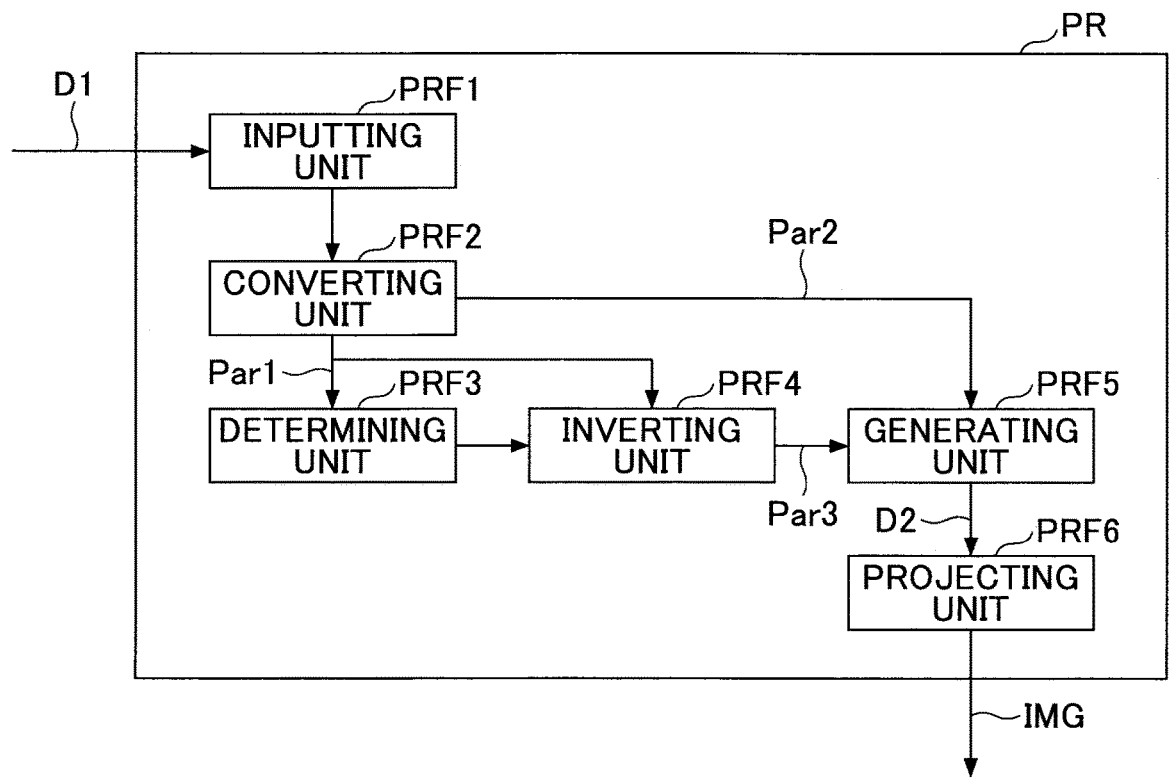
[Fig. 14]
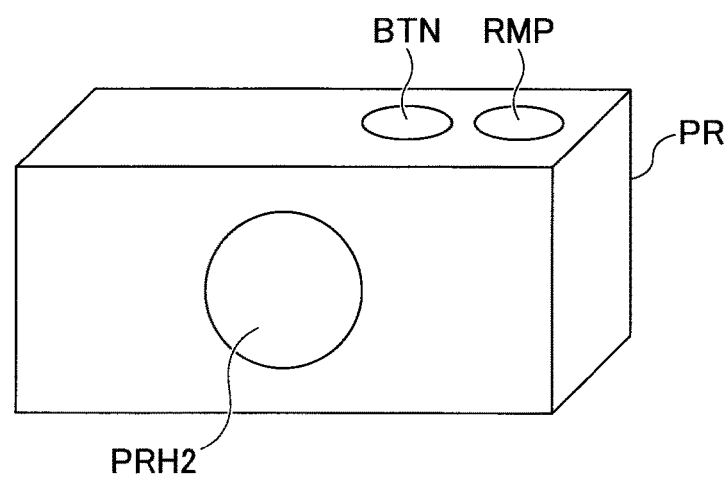

[Fig. 15]
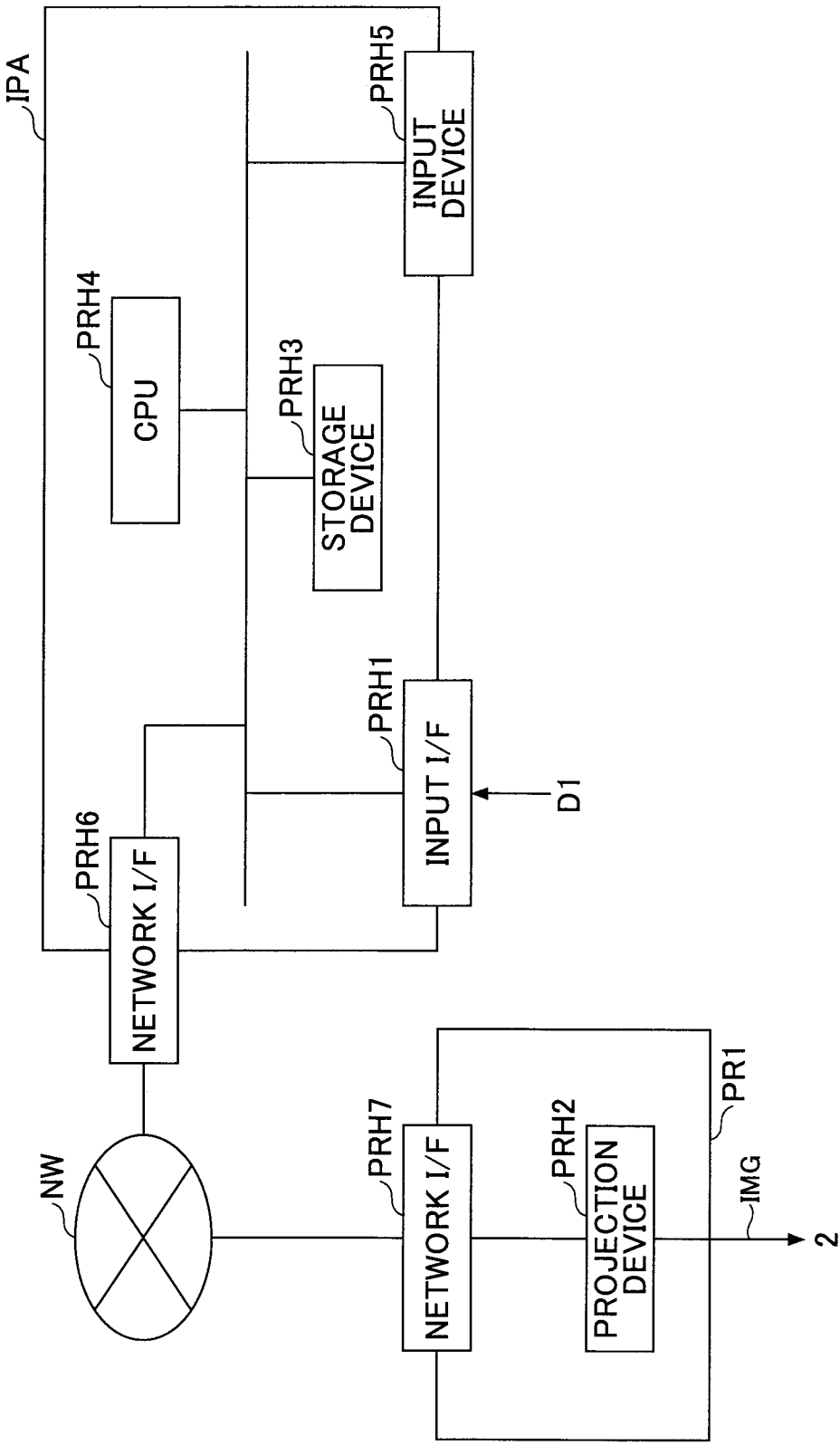

PROJECTION APPARATUS, PROJECTION SYSTEM, AND NON-TRANSITORY COMPUTER-READABLE RECORDING MEDIUM

TECHNICAL FIELD

The present disclosure relates to a projection apparatus, a projection system, a program, and a non-transitory computer-readable recording medium.

BACKGROUND ART

A projector that projects an image based on image data that is input is known.

An educational field, for example, is a big projector market, and the number of cases where a projector projects an image on a blackboard or an electronic blackboard in a school or the like may increase.

A method of inverting between the white color and the black color in a photographed image based on a histogram of pixel values of the photographed image to project, for example, is known for improving the visibility when the photographed image is projected directly on a blackboard. Actually, first, based on the histogram, it is determined whether the white color and colors close to the white color are more than the black color and colors close to the black color throughout the photographed image. If it has been determined that the black color and colors close to the black color are more than the white color and colors close to the white color, the black and white inversion is carried out on the photographed image (see PTL 1).

SUMMARY OF INVENTION

Technical Problem

According to PTL 1, when black and white inversion has been carried out, also hue and so forth are inverted, and therefore, the image that is not easy for a viewer to see may be projected.

An object of the present disclosure is to provide a projection apparatus capable of projecting an image that is easy for a viewer to see even when a plane of projection having low reflectance such as a blackboard is used.

Solution to Problem

According to one aspect, a projection apparatus configured to project an image includes an inputting unit configured to input image data that expresses the image; a converting unit configured to convert pixel values of the image data into first parameters that indicate lightness and second parameters that indicate information concerning color; a determining unit configured to determine whether to invert the first parameters; an inverting unit configured to invert the first parameters to calculate third parameters if the determining unit has determined to invert the lightness of the image; a generating unit configured to generate inverted data based on the second parameters and the third parameters; and a projecting unit configured to project the image based on the inverted data.

Effects of the Invention

It is possible to project an image easy for a viewer to see even when the image is projected on a plane of projection having low reflectance such as a blackboard.

BRIEF DESCRIPTION OF DRAWINGS

FIG. 1 illustrates one example as to how to use a projection apparatus according to an embodiment of the present invention.

FIG. 2 is a block diagram illustrating one example of a hardware configuration of the projection apparatus according to the embodiment of the present invention.

FIG. 3 is a flowchart illustrating one example of an overall process carried out by projection apparatus according to the embodiment of the present invention.

FIG. 4 illustrates one example of a procedure to calculate determination values and carry out determination using the determination values per 16 frames by the projection apparatus according to the embodiment of the present invention.

FIG. 5 illustrates one example of gamma correction carried out by the projection apparatus according to the embodiment of the present invention.

FIG. 6 illustrates one example of S-shape correction carried out by the projection apparatus according to the embodiment of the present invention.

FIG. 7 illustrates one example of adding a weighting coefficient carried out by the projection apparatus according to the embodiment of the present invention.

FIG. 8 illustrates one example of image data to be processed according to the embodiment of the present invention.

FIG. 9 illustrates one example of a process result of inversion in the overall process carried out by the projection apparatus according to the embodiment of the present invention.

FIG. 10 illustrates one example of a process result of gamma correction and S-shape correction according to the embodiment of the present invention.

FIG. 11A illustrates, together with FIGS. 11B-11F, examples of process results of determination using determination values in the overall process carried out by the projection apparatus according to the embodiment of the present invention.

FIG. 11B illustrates, together with FIGS. 11A and 11C-11F, examples of process results of determination using determination values in the overall process carried out by the projection apparatus according to the embodiment of the present invention.

FIG. 11C illustrates, together with FIGS. 11A, 11B, 11D, 11E, and 11F examples of process results of determination using determination values in the overall process carried out by the projection apparatus according to the embodiment of the present invention.

FIG. 11D illustrates, together with FIGS. 11A-11C, and 11E-11F, examples of process results of determination using determination values in the overall process carried out by the projection apparatus according to the embodiment of the present invention.

FIG. 11E illustrates, together with FIGS. 11A-11D and 11F, examples of process results of determination using determination values in the overall process carried out by the projection apparatus according to the embodiment of the present invention.

FIG. 11F illustrates, together with FIGS. 11A-11E, examples of process results of determination using determination values in the overall process carried out by the projection apparatus according to the embodiment of the present invention.

FIG. 12 illustrates one example of a subjective evaluation result according to the embodiment of the present invention.

FIG. 13 is a functional block diagram illustrating one example of a functional configuration of the projection apparatus according to the embodiment of the present invention.

FIG. 14 is an outline view of one example of the projection apparatus according to the embodiment of the present invention.

FIG. 15 is a block diagram illustrating one example of a hardware configuration of a projection system according to a variant of the embodiment of the present invention.

DESCRIPTION OF EMBODIMENTS

Other objects, features, and advantages will become more apparent from the following detailed description when read in conjunction with the accompanying drawings.

Below, the embodiment of the present invention will be described.

(Example of Overall Configuration)

FIG. 1 illustrates one example as to how to use the projection apparatus according to the embodiment of the present invention. As illustrated in FIG. 1, a projector PR as one example of the projection apparatus projects an image IMG on a blackboard 2, or the like, for a viewer 1. When the image IMG has been projected, the viewer 1 can see characters/letters included in the image IMG. Note that the blackboard 2 is one example of a projecting target (i.e., a plane of projection) on which the image IMG is projected. The projection target may also be a screen, a wall, or the like. Below, description will be made assuming one example where, as illustrated in FIG. 1, the projector PR projects the image IMG on the blackboard 2.

(Hardware Configuration Example)

FIG. 2 is a block diagram illustrating one example of a hardware configuration of the projection apparatus according to the embodiment of the present invention. The projector PR includes an input I/F (interface) PRH1, a projection device PRH2, a storage device PRH3, a CPU (Central Processing Unit) PRH4, and an input device PRH5.

The input I/F PRH1 is an interface to input data, a signal, and so forth, to the projector PR from a recording medium, an external apparatus, and so forth. The input I/F PRH1 includes a connector, a driver, a processing IC (Integrated Circuit), and so forth, for example. Through the input I/F PRH1, data such as image data D1 that expresses the image IMG is input to the projector PR.

The projection device PRH2 includes optical components such as a lens, a light source, and so forth. The projection device PRH2 emits light according to data, a signal, or the like, that is input. The projection device PRH2 projects an image on a projection target such as the blackboard 2.

The storage device PRH3 stores data, a program, setting values, and so forth. The storage device PRH3 is a main storage such as a memory, an auxiliary storage such as a hard disk drive, a combination of these storages, or the like.

The CPU PRH4 includes an arithmetic device that carries out various processes and modifies various data, and a control device that controls various hardware items. The CPU PRH4 may further include an arithmetic device and a control device to assist the CPU PRH4, and thus, may include a plurality of devices.

The input device PRH5 inputs user's operations using commands, or the like, and inputs data. Actually, the input device PRH5 includes, for example, switches, keyboard, a mouse, and so forth, for example.

(Example of Overall Process)

FIG. 3 is a flowchart illustrating one example of an overall process according to the embodiment of the present invention.

In step S01, the image data D1 is input to the projector PR. Below, description will be made assuming an example where the image data D1 has pixel values that are RGB (Red, Green, and Blue) values, and the pixel values are expressed by 8 bits (that can indicate any value in a range between 0 through 255).

In step S02, the projector PR converts the color space of the image data D1 that has been input. For example, in step S02, the color space of the image data D1 is converted from the RGB color space to a YCbCr color space.

Actually, the conversion of the color space is carried out based on, for example, Formulas (1) through (3).

$$Y = 0.257R + 0.504G + 0.098B + 16 \quad (1)$$

$$Cb = -0.148R - 0.291G + 0.439B + 128 \quad (2)$$

$$Cr = 0.439R - 0.368G - 0.071B + 128 \quad (3)$$

Note that the value Y calculated by Formula (1) corresponds to a so-called brightness signal, and is one example of a first parameter that represents lightness. The values Cb and Cr calculated by Formulas (2) and (3) correspond to color difference signals, correspond to values of so-called hue and saturation, or the like, and are one example of second parameters concerning color.

In step S03, the projector PR calculates determination values. That is, in step S03, the projector PR calculates values to be used to determine whether to invert lightness of the image expressed by the image data D1. In this regard, details will be described below.

In step S04, the projector PR determines whether to invert the lightness of the image expressed by the image data D1, based on the calculated determination values. If the projector PR has determined to invert the lightness of the image expressed by the image data D1 (YES in step S04), the projector PR proceeds to step S05. If the projector PR has determined to not invert the lightness of the image expressed by the image data D1 (NO in step S04), the projector PR proceeds to step S10.

As mentioned above, the projector PR carries out the determination in step S04 based on the determination values calculated in step S03. In this regard, the determination values calculated in step S03 include, for example, the standard deviation $\sigma$ of values Y calculated by Formula (1), or the like. The standard deviation $\sigma$ is calculated based on the values Y of the respective pixels expressed by the image data D1.

In this case, in step S04, the projector PR determines whether to invert the lightness of the image expressed by the image data D1 according to whether the standard deviation $\sigma$ is less than or equal to a certain threshold (hereinafter, referred to as a "first threshold"). Note that the first threshold is previously set. When the image data D1 is expressed by 8 bits as mentioned above, it is desirable that, for example, a value on the order of "30" is set as the first threshold.

A case where the standard deviation $\sigma$ has a greater value is a case where, in many cases, the image data is content that includes many natural images. On the other hand, a case where the standard deviation $\sigma$ has a smaller value is a case where, in many cases, the image data is content that includes many letters/characters. Therefore, if the standard deviation $\sigma$ has a greater value, the projector PR determines to not invert the lightness of the image expressed by the image data D1 (NO in step S04). If the standard deviation $\sigma$ has a smaller value, the projector PR determines to invert the lightness of the image expressed by the image data D1 (YES in step S04).

Also, it is desirable to further use the average AVG of the values Y as the determination value. If image data D1 that is input expresses an image where there are white characters/letters in a black background, the image may become rather difficult for the viewer to see when the lightness of the image has been inverted. If the standard deviation σ is used to determine whether to invert the lightness of the image expressed by the image data D1, the projector PR may determine to invert the lightness of the image expressed by the image data D1 (YES in step S04) even if the image data D1 expresses the image where there are white characters/letters in a black background.

If the image data D1 expresses an image that has a white background, the average AVG is likely to have a greater value. Therefore, for example, the projector PR may determine whether to invert the lightness of the image expressed by the image data D1 according to whether the average AVG is greater than or equal to a certain threshold (hereinafter, referred to as a "second threshold") in addition to whether the standard deviation σ is less than or equal to the first threshold.

That is, if the average AVG is greater than or equal to the second threshold and the standard deviation σ is less than or equal to the first threshold, a likelihood that the image data D1 expresses an image where there are characters/letters in a white background is high. Therefore, in this case, the projector PR may determine to invert the lightness of the image expressed by the image data D1 (YES in step S04). Note that the second threshold is previously set. When the image data D1 is expressed by 8 bits, it is desirable that a value on the order of "180", for example, is set as the second threshold.

Also, it is further desirable to further use a count value acquired from counting the pixels each of which has the white color included in the image data D1 (hereinafter, referred to as the "number of white pixels"), and a count value acquired from counting the pixels each of which has the black color included in the image data D1 (hereinafter, referred to as the "number of black pixels") as the determination values. Even if the image data D1 expresses a binary image that includes many characters/letters, ruled lines, and so forth, the standard deviation σ may have a greater value.

Therefore, the projector PR may also calculate the number of white pixels and the number of black pixels included in the image data D1, and determine whether the number of white pixels is greater than the number of black pixels. Then, if the number of white pixels is greater than the number of black pixels, the projector may determine to invert the lightness of the image expressed by the image data D1 (YES in step S04).

Note that the pixels each of which has the white color may include pixels each of which has a light gray color or the like near the white color. For example, when the image data D1 is expressed by 8 bits, the pixels each of which has the white color may include not only the pixels each of which has a pixel value "255" but also the pixels each of which has a pixel value greater than or equal to "230", or the like. In the same way, the pixels each of which has the black color may include pixels each of which has a dark gray color or the like near the black color. For example, when the image data D1 is expressed by 8 bits, the pixels each of which has the black color may include not only the pixels each of which has a pixel value "0" but also the pixels each of which has a pixel value less than or equal to "15", or the like.

Also, as the determination value, the number of colors of an image expressed by the image data D1 may be suitably used. The projector PR may determine to invert the lightness of the image expressed by the image data D1, if the number of colors is less than a certain value, and thus, the image expressed by the image data D1 is comparatively close to a monochrome image. On the other hand, the projector PR may determine to not invert the lightness of the image expressed by the image data D1 if the number of colors is greater than a certain value, and thus, the image expressed by the image data D1 is comparatively a colorful image.

By thus carrying out determination based on the determination values, the projector PR can properly carry out determination to invert the lightness of the image expressed by the image data D1 on an image that includes characters/letters, or the like. In the same way, the projector PR can properly carry out determination to not invert the lightness of the image expressed by the image data D1 on an image that includes a photograph, an animation, or the like.

Note that as the determination value, a variance, or the like, for example, may be used.

Also, all the pixels of the image data D1 need not be used for calculating the determination values and carrying out determination using the determination values. That is, the projector PR may calculate the standard deviation σ, the average AVG, or the like, as the determination value, by scanning the image data D1 longitudinally and laterally to use 1 pixel per 16 pixels, for example. By thus thinning out the calculation objects, it is possible to reduce the load of the projector PR to calculate the determination values.

In the same way, if the image data D1 expresses a moving image, all the frames of the image data D1 need not be used for calculating the determination values and carrying out determination using the determination values.

FIG. 4 illustrates one example of a procedure to calculate the determination values and carry out determination using the determination values per 16 frames by the projector PR according to the embodiment of the present invention. As illustrated in FIG. 4, calculation of the determination values and carrying out determination using the determination values may be carried out per 16 frames, for example. That is, the projector PR uses the first frame of each 16 frames to calculate the determination values and carry out determination using the determination values, and inverts the lightness of the other 15 frames, if appropriate, according to the determination result carried out using the first frame. By thus thinning out the frames from the frames to be actually used as the calculation objects, it is possible to reduce the load of the projector PR to calculate the determination values, and it is possible to prevent the process accuracy from being degraded.

Returning to FIG. 3, in step S05, the projector PR calculates a third parameter by inverting the first parameter. Actually, the inverting the first parameter is carried out based on Formula (4) if the image data is expressed by 8 bits.

$$Y'=255-Y \tag{4}$$

A value Y in Formula (4) is the brightness value calculated in Formula (1), or the like, and is one example of the first parameter, as mentioned above. A value Y' that is one example of the third parameter is acquired, as illustrated in Formula (4), from subtracting the value Y from the value "255" that is the maximum value of image data that is expressed by 8 bits.

In step S06, the projector PR carries out gamma correction on the third parameter. If a target on which an image is projected has a black color, or the like, the reflectance of the target is, in many cases, the tenth, or the like, of the reflectance of a white screen, or the like. Therefore, if the projection target has a black color or the like, the contrast is reduced accordingly in many cases. As a result, if the projection target has a black color or the like, characters/ letters, or the like, projected on the target may be not easy for the viewer to see. Therefore, it is desirable to carry out gamma correction on the third parameter to enhance lightness. For example, gamma correction is carried out based on Formula (5).

$$Y''=Y'^t \quad (5)$$

FIG. 5 illustrates one example of gamma correction carried out by the projection apparatus according to the embodiment of the present invention. When gamma correction based on Formula (5) has been carried out, the value Y' calculated through inverting the lightness of the image expressed by the image data D1 based on Formula (4) is corrected to a value Y" as illustrated in FIG. 5. Thus, by carrying out gamma correction, it is possible to enhance lightness, and therefore, the projector PR can project an image easy for the viewer to see.

Note that it is desirable to carry out gamma correction in a color space where color and lightness are separated such as a YCbCr color space, a HSV (Hue, Saturation, and Value) color space, or the like. By carrying out gamma correction in a color space where color and lightness are separated, the projector PR can improve the image quality of an image acquired through gamma correction.

Also, in order to make an image acquired through inverting the lightness of the image expressed by the image data D1 appear lighter, the projector PR may add an offset value that is a certain value that is previously set to each pixel value, after carrying out gamma correction. That is, for example, as illustrated in Formula (6), the projector PR may add a constant C to the value Y" calculated through gamma correction based on Formula (5).

$$Y'''=Y''+C \quad (6)$$

As illustrated in Formula (6), as a result of the constant C being added to each pixel value, the value that indicates lightness increases accordingly, and thus, the projector PR can project a lighter image.

Returning to FIG. 3, in step S07, the projector PR carries out S-shape correction on the second parameters. Actually, in this example, the projector PR carries out S-shape correction on the values Cb and Cr, respectively. Note that, S-shape correction is one example of enhancement correction for enhancing the second parameters.

FIG. 6 illustrates one example of S-shape correction carried out by the projection apparatus according to the embodiment of the present invention. As illustrated in FIG. 6, by carrying out S-shape correction on values Cb and Cr, respectively, it is possible to enhance saturation while maintaining hue.

There is the so-called Helmholtz Kohlrausch effect that is a visual feature by which an image that has higher saturation appears lighter to a human. Therefore, as a result of S-shape correction being carried out on the second parameters when the image is projected on a target that has low reflectance such as a blackboard, the projected image appears lighter to a human. Thus, it is possible to project an image easy for the viewer to see.

Note that it is desirable that gamma correction and S-shape correction are implemented using look-up tables. By using look-up tables for carrying out gamma correction and S-shape correction, the projector PR can carry out the process at a high speed.

Returning to FIG. 3, in step S08, the projector PR carries out inverse conversion of the color space. That is, in step S08, the projector PR converts the color space of the value Y' calculated through inverting the lightness of the image expressed by the image data D1 based on Formula (4) and the values Cb and Cr calculated through the conversion based on Formulas (2) and (3) into the RGB color space. Actually, in step S08, the projector PR carries out the inverse conversion based on Formulas (7) through (9) below. Note that, if gamma correction based on Formula (5) is carried out, the value Y" is used instead of Y' in the inverse conversion of Formulas (7) through (9). In the same way, if the addition based on Formula (6) is carried out, the value Y''' is used instead of Y' in the inverse conversion of Formulas (7) through (9).

$$R'=1.164(Y'-16)+1.596(Cr-128) \quad (7)$$

$$G'=1.164(Y'-16)-0.391(Cb-128)-0.813(Cr-128) \quad (8)$$

$$B'=1.164(Y'-16)+2.018(Cb-128) \quad (9)$$

Next, in step S08, the projector PR stores the values R', G', and B' calculated through Formulas (7) through (9), respectively, and generates data (hereinafter, referred to "inverted data").

In step S09, the projector PR generates an image to project based on a weighting coefficient T, the image data, and the inverted data. That is, the projector PR changes the image to project with time. Actually, first, in step S09, the projector PR changes the weighting coefficient T with time. For example, the projector PR determines an initial value of the weighting coefficient T as "0", and gradually increases the weighting coefficient T with time until the weighting coefficient T reaches "1". Next, in step S09, the projector PR carries out calculation of Formula (10) based on the weighting coefficient T, the image data, and the inverted data.

$$(R_{tmp}, G_{tmp}, B_{tmp})^t = (1-T) \times (R,G,B)^t + T \times (R',G',B')^t \quad (10)$$

In Formula (10), ( )$^t$ denotes a transposed matrix. Also, in Formula (10), the values (R, G, B) denote the image data D1 that is the RGB values before being inverted in lightness. Also, in Formula (10), the values (R', G', B') denote the inverted data that is the RGB values after being inverted in lightness. Thus, the weight of the inverted data increases with time.

Through calculation according to Formula (10), the projector PR can gradually change the image to project from the image expressed by the image data D1 into the image expressed by the inverted data with time. By thus gradually changing the image with time, the projector PR can provide the image that gives a less uncomfortable feeling to the viewer. Also, by gradually changing the weighted addition of the inverted image and the non-inverted image with time as illustrated in FIG. 7, the image appears to gradually change to the viewer. Thus, it is possible to reduce the viewer's eyestrain.

Returning to FIG. 3, after step S09, the projector PR proceeds to step S10.

In step S10, the projector PR projects the image.

(Example of Process Result)

FIG. 8 illustrates one example of image data D1 to be processed by the embodiment of the present invention. For example, description will now be made assuming one example where the image data D1 that expresses an image illustrated in FIG. 8 is input. Note that there are characters/letters 3 in a gray color or the like in the image expressed by the image data D1 that is input.

FIG. 9 illustrates one example of a process result of inverting the lightness of the image expressed by the image data D1 in the overall process carried out by the projection apparatus according to the embodiment of the present invention. FIG. 9 illustrates a process result of inverting the lightness of the image expressed by the image data D1 in step S05 of FIG. 3 on the image illustrated in FIG. 8. As illustrated in FIG. 9, as a result of the inverted image being generated, the projector PR can project the image easy for the viewer to see.

FIG. 10 illustrates one example of a process result of gamma correction and S-shape correction according to the embodiment of the present invention. FIG. 10 illustrates a process example of the process of FIG. 3 being carried out on the image of FIG. 8. As a result of gamma correction and S-shape correction and so forth being carried out, the projector PR can project the corrected characters/letters (hereinafter, referred to as "corrected characters") 4. As illustrated in FIG. 10, the corrected characters 4 are clearer. Thus, as a result of gamma correction, S-shape correction, and so forth, being carried out, legibility of characters/letters for the viewer is improved, and therefore, the projector PR can project an image easier for the viewer to see.

As mentioned above, in step S04 of FIG. 3, the projector PR determines whether to invert lightness of the image expressed by the image data D based on the determination values.

FIGS. 11A-11F illustrate examples of process results of determinations using the determination values in the overall process carried out by the projection apparatus according to the embodiment of the present invention. FIGS. 11A and 11D illustrate respective examples of images expressed by image data D1.

Such an image as an image illustrated in FIG. 11A is used for presentation or in a document using a table, a graph, or the like, and has a discrete distribution of pixel values as illustrated in histograms illustrated in FIG. 11B in many cases.

On the other hand, such a natural image as an image illustrated in FIG. 11D has a continuous distribution of pixel values as illustrated in a histogram of FIG. 11E in many cases.

When the image illustrated in FIG. 11A will be projected on a projection target such as a blackboard, the projector PR can project the image easier for the viewer to see such as an image illustrated in FIG. 11C by inverting the lightness of the image before projecting the image.

On the other hand, when the image illustrated in FIG. 11D will be projected, the projector PR can project an image easier for the viewer to see such as an image illustrated in FIG. 11F by not inverting the lightness of the image but carrying out a contrast enhancement process, or the like, before projecting the image.

Thus, by determining whether to invert the lightness of the image expressed by the image data D1 using the determination values such as the standard deviation, the average, the number of white pixels, or the number of black pixels, or any combination of the standard deviation, the average, the number of white pixels, and the number of black pixels, the projector PR can project an image easier for the viewer to see.

In order to quantitatively clarify the superiority of the embodiment of the present invention, subjective evaluation was performed. In the subjective evaluation, a relative comparison was performed as to how a projected image according to the embodiment of the present invention appears in comparison to a case of the related art of projecting an image on a blackboard. An evaluation scale used in the subjective evaluation is illustrated below as Table 1.

TABLE 1

| SCORE | EVALUATION RESULT |
| --- | --- |
| 3 | VERY GOOD |
| 2 | GOOD |
| 1 | RATHER GOOD |
| 0 | NOT GOOD BUT NOT BAD |
| −1 | RATHER BAD |
| −2 | BAD |
| −3 | VERY BAD |

Thus, a plus score was given when the evaluation result was better than a reference. In the same way, a minus score was given when the evaluation result was worse than the reference.

Images used for the evaluation are images that include content such as a table, a Japanese sentence, an English sentence, and so forth, assumed to be projected on a blackboard.

Evaluation items include "easy-to-see property of projected image" and "favorability of projected image", as illustrated in FIG. 12.

As a comparison example, a blackboard mode in another apparatus ("IN OTHER APPARATUS" in FIG. 12) was also evaluated.

A function of the blackboard mode of the other apparatus was different from the embodiment of the present invention ("IN EMBODIMENT" in FIG. 12). That is, in the other apparatus, color correction was carried out such that a projected image would be prevented from being biased to the blackboard's tint (i.e., dark green) and would be projected in a white color as much as possible.

Evaluators were 8 persons each of whom had normal eyesight.

FIG. 12 illustrates the subjective evaluation result. Error bars in the graph of FIG. 12 denote the standard deviations of the scores of the respective evaluators.

As illustrated in FIG. 12, it can be seen that the method of the embodiment of the present invention is superior from the easy-to-see viewpoint and the favorability in comparison to the comparison example.

In fact, the evaluation scores in the embodiment of the present invention are higher than the evaluation scores in the other apparatus, and thus, the superiority of the embodiment of the present invention is clarified.

(Example of Functional Configuration)

FIG. 13 is a functional block diagram illustrating one example of a functional configuration of the projection apparatus according to the embodiment of the present invention. As illustrated in FIG. 13, the projector PR includes an inputting unit PRF1, a converting unit PRF2, a determining unit PRF3, an inverting unit PRF4, a generating unit PRF5, and a projecting unit PRF6.

The inputting unit PRF1 inputs image data D1 that expresses an image. Note that, the inputting unit PRF1 is implemented by, for example, the input I/F PRH1 (FIG. 2), the input device PRH5 (FIG. 2), and so forth.

The converting unit PRF2 converts the pixel values of the image data D1 into the first parameters Par1 such as the values Y that indicate lightness, and the second parameters Par2 that indicate information concerning color such as the values Cb, the values Cr, and so forth. Note that the converting unit PRF2 is implemented by, for example, the CPU PRH4 (FIG. 2), and so forth.

The determining unit PRF3 determines whether to invert the first parameters Par1 based on the determination values, or the like. Note that the determining unit PRF3 is implemented by, for example, the CPU PRH4, and so forth.

The inverting unit PRF4 inverts the first parameters Par1 to generate the third parameters Par3 if the determining unit PRF3 has determined to invert the first parameters Par1. Note that the inverting unit PRF4 is implemented by, for example, the CPU PRH4, and so forth.

The generating unit PRF5 generates the inverted data D2 based on the second parameters Par2 and the third parameters Par3. Note that, the generating unit PRF5 is implemented by, for example, the CPU PRH4, and so forth.

The projecting unit PRF6 projects the image IMG based on the inverted data D2. Note that, the projecting unit PRF6 is implemented by, for example, the projection device PRH2 (FIG. 2), and so forth.

FIG. 14 is an outline view of one example of the projection apparatus according to the embodiment of the present invention. For example, as illustrated in FIG. 14, the projector PR has an input device such a button BTN. The button BTN is pressed by the viewer, or the like, when the viewer has determined that the projection target is a blackboard, or the like. That is, the viewer presses the button BTN if the optical axis of the projection device PRH2 is directed to the blackboard, or the like.

Note that, the projector PR may have a light source RMP such as a LED (Light Emitting Diode). For example, the light source RMP emits light while the projector PR is inverting the lightness of the image expressed by the image data D1. Through the light source RMP, the viewer can easily know whether the projector PR is inverting the lightness of the image expressed by the image data D1.

When the button BTN has been operated, the projector PR can determine that the projection target is a blackboard, or the like. Next, in the projector PR, image data D1 (FIG. 13) is input through the inputting unit PRF1. Next, in the projector PR, the converting unit PRF2 converts the pixel values of the image data D1 in the RGB color space into the first parameters such as values Y and the second parameters such as values Cb and Cr, or the like. That is, the converting unit PRF2 converts the image data D1 from the RGB color space to the YCbCr color space.

Next, in the projector PR, the determining unit PRF3 first calculates the determination value such as the average or the standard deviation of the first parameters, or the like. Next, in the projector PR, the determining unit PRF3 determines whether to invert the lightness of the image expressed by the image data D1 by comparing the determination value with the first threshold or the second threshold, for example.

If the determining unit PRF3 has determined to invert the lightness of the image expressed by the image data D1, the inverting unit PRF4 of the projector PR inverts the first parameters to calculate the third parameters such as values Y'. Also, in the projector PR, the generating unit PRF5 generates the inverted data based on the third parameters calculated by the inverting unit PRF4 and the second parameters generated through conversion by the converting unit PRF2.

Next, in the projector PR, the projecting unit PRF6 projects the image IMG based on the inverted image generated by the generating unit PRF5. Thus, the projecting unit PRF6 can project the image IMG that is easy for the viewer to see. Thus, the hues of colors can be easily maintained. Therefore, for example, if the image data expresses characters/letters in a red color, it is possible to project the characters/letters in a color close to red, and therefore, the projector PR can project the image that gives a less uncomfortable feeling for the viewer.

Also, if a non-inverted image such as the image illustrated in FIG. 8 having a white background is projected on a blackboard that has a black color or the like, characters/letters or the like that have been previously written on the blackboard with a white chalk or the like may become not easy to read due to the white background of the projected image. In contrast thereto, when the inverted image such as the image illustrated in FIG. 9 is projected, the background of the projected image has the black color as illustrated in FIG. 9. Therefore, it is possible to prevent such a situation that characters/letters or the like that have been previously written on the blackboard with a white chalk or the like become not easy to read from occurring frequently.

Also, if the generating unit PRF5, for example, further carries out a correction such as gamma correction, S-shape correction, adding a constant to each pixel value, or the like, as mentioned above, in the YCbCr color space, The projector PR can improve the image quality of the image IMG to project.

Also, if the generating unit PRF5, for example, changes the weighting coefficient with time, as mentioned above, the projector PR can invert the lightness of the image expressed by the image data D1 gradually based on the weighting coefficient.

(Variant)

Embodiments are limited to the above-mentioned configuration to convert the color space of given image data into the YCbCr color space. It is also possible to convert the color space of given image data into a color space where lightness and information concerning color are separated, other than the YCbCr color space. For example, it is also possible to convert the color space of given image data into a YUV color space, or the like. Also, it is also possible to convert the color space of given image data into a HSV color space where values that indicate lightness values are used as the first parameters, or the like.

Note that, part or all of the embodiment of the present invention may be implemented by a program described by low-level language such as C language, Java (registered trademark), or the like, high-level language, or combination of these languages, for causing a computer to carry out various processes. That is, the program is a computer program that causes a computer of an information processing apparatus, an information processing system that includes one or more information processing apparatuses, or the like, to carry out various processes.

Also, the program may be distributed after being stored in a computer-readable recording medium such as a ROM (Read-Only Memory), an EEPROM (Electrically Erasable Programmable ROM), or the like. Also, the recording medium may be an EPROM (Erasable Programmable ROM), a flash memory, an optical medium such as a Blu-ray disc, or the like, a SD (registered trademark) card, a MO (Magneto-Optical Disc), or the like. Also, the program may be distributed via a telecommunications line.

Also, as illustrated in FIG. 15, the processes according to the embodiment of the present invention may be implemented by a projection system that includes a projector PR1 (one example of a projection apparatus) and at least one information processing apparatus IPA. As illustrated in FIG.

15, the at least one information processing apparatus IPA is connected with the projector PR1 via a network NW, or the like.

The at least one information processing apparatus IPA carries out the respective processes of calculation, conversion, and so forth, included in the processes according to the embodiment of the present invention described above with reference to FIG. 3, and so forth, in a manner of distributing the respective processes, carrying out the respective processes in parallel, carrying out the respective processes redundantly, or the like.

The input I/F PRH1, the projection device PRH2, the storage device PRH3, the CPU PRH4, and the input device PRH5 included in the projector PR1 and the at least one information processing apparatus IPA, respectively, as illustrated in FIG. 15, may be the same as the input I/F PRH1, the projection device PRH2, the storage device PRH3, the CPU PRH4, and the input device PRH5, included the projector PR described above with reference to FIG. 2, respectively, and therefore, duplicate description will be omitted.

Each of a network I/F PRH6 and a network I/F PRH7 included in the at least one information processing apparatus IPA and the projector PR1, respectively, is one example of an interface for the at least one information processing apparatus IPA and the projector apparatus PR1 to carry out communications with the projector PR1 and the information processing apparatus IPA, respectively, via the network NW, and can be an Ethernet (registered trademark) interface, a USB (Universal Serial Bus) interface, or the like.

Note that which ones of the above-mentioned respective elements PRH1 through PRH5 are included in either of the at least one information processing apparatus IPA and the projector PR1 may be freely changed from the configuration illustrated in FIG. 15 while the number of the information processing apparatuses IPA may be freely increased to be two or more.

Thus, the projection apparatuses, the projection systems, the programs, and the non-transitory computer-readable recording media have been described in the embodiments. However, the present invention is not limited to the above-described embodiments, and various modifications and replacements may be made within the scope of the present invention.

The present application is based on and claims the benefit of priority of Japanese Patent Application No. 2015-200383, filed on Oct. 8, 2015, the entire contents of which are hereby incorporated herein by reference.

CITATION LIST

Patent Literature

[PTL 1] Japanese Unexamined Patent Application No. 2005-208092

REFERENCE SIGNS LIST

PR, PR1 projector
IPA information processing apparatus
IMG image
1 viewer
2 blackboard
D1 image data
D2 inverted data
Par1 first parameter
Par2 second parameter
Par3 third parameter

The invention claimed is:

1. A projection apparatus configured to project an image, the projection apparatus comprising:
    an inputting unit configured to input image data that expresses the image;
    a processor;
    a memory storing program instructions that cause the processor to:
        convert pixel values of the image data into first parameters that indicate lightness and second parameters that indicate information concerning color,
        determine whether to invert the first parameters based on at least one of a variance, a standard deviation, or an average of the first parameters, the variance, the standard deviation, and the average of the first parameters being calculated based on converted pixel values of less than all of the pixels present in the image data, invert the first parameters to calculate third parameters if the determining unit has determined to invert the first parameters,
        generate inverted data based on the second parameters and the third parameters;
        perform S-shape correction on the second parameters after the third parameters have been calculated; and
    a projecting unit configured to project the image based on the image data, the inverted data, and a weighting coefficient that increases with time, wherein
        the projected image gradually changes from an image expressed by the image data to an inverted image expressed by the inverted data in accordance with increases in the weighting coefficient that increases with time.

2. The projection apparatus according to claim 1, wherein the first parameters indicate brightness values or lightness values.

3. The projection apparatus according to claim 1, wherein the program instructions further causes the processor to
    determine to invert the first parameters if the variance or the standard deviation of the first parameters is less than or equal to a first threshold.

4. The projection apparatus according to claim 3, wherein the program instructions further causes the processor to
    determine to invert the first parameters if the average of the first parameters is greater than or equal to a second threshold.

5. The projection apparatus according to claim 4, wherein the program instructions further causes the processor to
    determine to invert the first parameters if the number of white pixels each of which has a white color included in the image data is greater than the number of black pixels each of which has a black color included in the image data.

6. The projection apparatus according to claim 1, wherein the program instructions further causes the processor to
    carry out gamma correction on the third parameters and carry out enhancement correction to correct the second parameters to enhance the second parameters, in a color space where lightness and information concerning color are separated.

7. The projection apparatus according to claim 6, wherein the program instructions further causes the processor to
    add a certain value to each of the third parameters on which gamma correction has been carried out.

8. A projection system comprising:

a projection apparatus configured to project an image; and at least one information processing apparatus connected to the projection apparatus, wherein the projection apparatus and the at least one information processing apparatus include an inputting unit configured to input image data that expresses the image;

a processor;

a memory storing program instructions that cause the processor to:

convert pixel values of the image data into first parameters that indicate lightness and second parameters that indicate information concerning color, determine whether to invert the first parameters based on at least one of a variance, a standard deviation, or an average of the first parameters, the variance, the standard deviation, and the average of the first parameters being calculated based on converted pixel values of less than all of the pixels present in the image data invert the first parameters to calculate third parameters if the determining unit has determined to invert the first parameters, generate inverted data based on the second parameters and the third parameters;

perform S-shape correction on the second parameters after the third parameters have been calculated; and a projecting unit configured to project the image based on the image data, the inverted data, and a weighting coefficient that increases with time, wherein the projected image gradually changes from an image expressed by the image data to an inverted image expressed by the inverted data in accordance with increases in the weighting coefficient that increases with time.

9. The projection system comprising according to claim 8, wherein the program instructions further cause the processor to:

convert the pixel values of 1 pixel for every 16 pixels present in the image data into the first parameters and the second parameters.

10. A non-transitory computer-readable recording medium that stores program instructions that cause a computer to carry out a process for projecting an image, the process comprising:

inputting image data that expresses the image;

converting pixel values of the image data that is input into first parameters that indicate lightness and second parameters that indicate information concerning color;

determining whether to invert the first parameters based on at least one of a variance, a standard deviation, or an average of the first parameters, the variance, the standard deviation, and the average of the first parameters being calculated based on converted pixel values of less than all of the pixels present in the image data;

inverting the first parameters to calculate third parameters if the computer has determined to invert the first parameters;

performing S-shape correction on the second parameters after the third parameters have been calculated; and generating inverted data based on the second parameters and the third parameters, the image being projected based on the image data, the inverted data, and a weighting coefficient that increases with time, wherein the projected image is gradually changed from an image expressed by the image data to an inverted image expressed by the inverted data in accordance with increases in the weighting coefficient that increases with time.

11. The non-transitory computer-readable recording medium according to claim 10, wherein the process further comprises:

the conversion of pixel values into the first parameters and the second parameters is performed for 1 pixel for every 16 pixels present in the image data.

12. The projection apparatus according to claim 1, wherein the program instructions further causes the processor to:

convert the pixel values of 1 pixel for every 16 pixels present in the image data into the first parameters and the second parameters.

* * * * *